Oct. 24, 1933.   J. STAFAK   1,931,775
ELECTRIC SWITCH FOR AUTOMOBILE SIGNAL SWITCHES
Original Filed Aug. 1, 1930
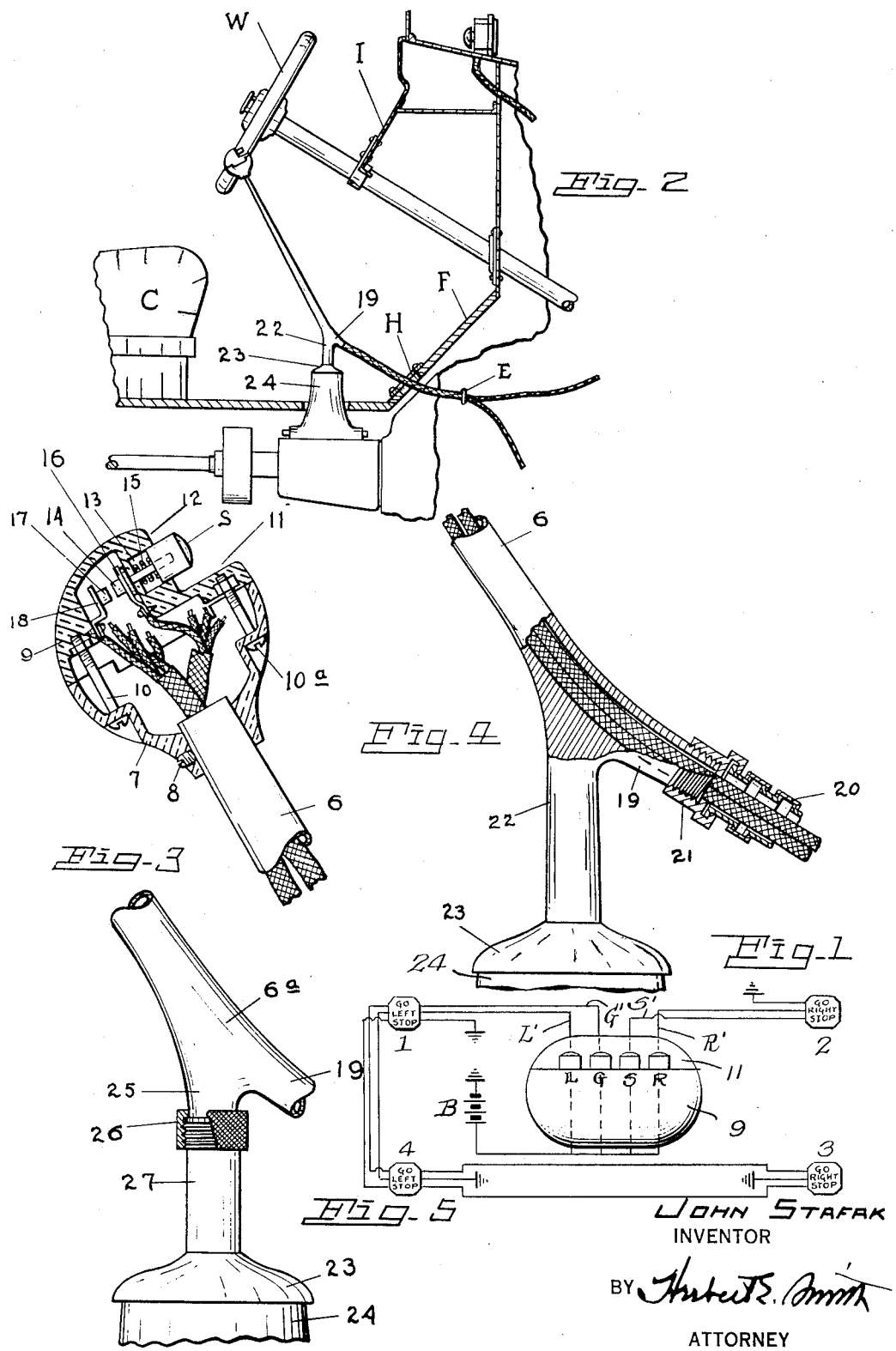
John Stafak
INVENTOR
BY Hubert S. Smith
ATTORNEY Patented Oct. 24, 1933

1,931,775

UNITED STATES PATENT OFFICE

1,931,775

ELECTRIC SWITCH FOR AUTOMOBILE SIGNAL SWITCHES

John Stafak, Aberdeen, Wash.

Application August 1, 1930, Serial No. 472,255
Renewed March 14, 1933

2 Claims. (Cl. 200—59)

My present invention relates to improvements in electric switches for automobile signals of the electrically operated type, and comprising a plurality of lamp casings or boxes, at the front and rear of a vehicle, or at other suitable locations, and provided with direction indicators thereon, as Go, Right, and Stop, and Go, Left, and Stop. The indicators are designed to be individually and separately illuminated to indicate to pedestrians, motorists, and others, the movements forward or to the right or left, or the intention to stop, by the driver of the vehicle equipped with the signals.

As here illustrated four of the lamp casings are employed and all are equipped with Go signs, two at the front and rear respectively, and in addition the right and left casings are furnished with the Right and Left signs respectively. The lamp casings are adapted to be illuminated, as to their signs, in varying or contrasting colors, appropriate for the purpose.

A signal switch or circuit maker is provided for each indicator or sign, the switch in each instance being adapted to display the signs singly, or in pairs as the case may be, and the several switches are mounted on and in a hollow head of the gear shifting or control lever of the automotive vehicle, thus locating the switches where they are readily accessible to the fingers of the hand that controls the gear-shift lever.

The invention consists in certain novel combinations and arrangements of parts as will hereinafter more fully be described and claimed.

In the accompanying drawing I have illustrated one complete example, and a modification, of the physical embodiment of my invention, wherein the parts are combined and arranged according to the best modes I have thus far devised for the practical application of the principles of my invention.

Figure 1 is a diagrammatic view of the electrical wiring of the signals.

Figure 2 is a view showing the gear shift lever in its relation to other parts of the automobile, and equipped with the electrical connections of my invention.

Figure 3 is an enlarged sectional view of the hollow head of the gear shift lever, showing the electrical connections and one of the four switches mounted in the head.

Figure 4 is a detail view partly in section, at the lower end of the gear shift lever.

Figure 5 is a detail view of part of the lever when used as an attachment for cars or vehicles already in use.

In equipping automotive vehicles with the signals of my invention I utilize the gear shift lever for controlling the speed of the car, and provision is made for applying the invention as an attachment to automobiles now in use by substituting a specially constructed lever for the existing lever already in use. In equipping the cars as they leave the factory, the lever is part of the factory equipment.

The gear shift lever 6 is employed for the performance of its usual functions, and is located in the usual position with respect to the cushion or seat C, the steering wheel W, and the instrument board I, in Figure 2 and in this figure of the drawing the footboard F is provided with a hole H, through which the wires L', G', R', and S' pass to their respective lamp boxes or signal casings.

The gear shift lever 6 is tubular and the wires are gathered in the interior thereof and carried to the sectional, hollow head 7 of the lever, which head is secured at the top or upper end of the lever as by a set screw or bolt 8. The hollow head is fashioned with a removable cap 9, and the latter is secured to the head by means of interior bolts 10 having exterior screw heads 10a, providing ready access to the interior of the head when required.

One portion of the cap is fashioned with a side groove or angular cut-out 11, and the head is secured on the lever with this groove at the front. One wall of the groove, as 12 is provided with four spaced sockets 13 to accommodate four switch buttons, as L, G, S, and R that control the left, go, stop, and right signals, and these buttons are conveniently arranged for use by the four fingers of the right hand, i. e., of the hand which naturally operates the lever. The "left" and "right" buttons are thus arranged at the left and right ends of the row, and the "go" and "stop" buttons are arranged intermediately of the ends of the row in order that the relative positions of the buttons may easily be learned, and the operation of the signals may thus become practically involuntary movements on the part of the driver of the car.

The stem 14 of each button is provided with a spring 15, against the tension of which the button is pressed, and to the stem is secured a terminal 16 of one of the several wires of the lamp circuits. Each of the movable contacts provided by a button has a complementary, stationary contact member 17 secured to a terminal 18 of one of the wires, and it will be apparent that by pressing one of the buttons a selected signal may be displayed. From the hollow head, the wires for the several circuits L', G', S', R', pass through the tubular lever to the lamp boxes or signal boxes not shown, and a battery B is indicated in Figure 1 as a source for the illumination of the signals.

The lever 6, near its lower end is fashioned with a tubular, lateral extension 19 and the wires pass therethrough to a flexible tube 20, which is coupled, as at 21, to the threaded end of the extension.

The tubular lever is fashioned with a shank 22 and the usual pivot-head 23 for co-operation with the lever-support or hollow, tapering base 24.

In Figure 5 a specially formed lever 6a is provided as an attachment for automobiles already in use. The lever is fashioned with the lateral extension 19, but with a short, flanged shank 25, that is coupled by nut 26 to the threaded upper end of the stem 27, and the pivot head 23 and base 24, are the same as in Figure 4.

As thus arranged, the switches are all compactly arranged and located in the ball or head of the lever, with the buttons exterior of the head, and the switches or circuit makers are readily accessible for the mechanic in the initial equipment of the car with the signals, as well as for necessary repairs from time to time.

The cables, cords, or wires, where they pass through the hole H in the foot board F, are also passed through an eyelet or eyebolt E, and that portion of the cable between the eye and the lever affords the required flexibility in the cable to permit the movements of the gear shift lever when the latter is being used to shift the gears in the regular performance of its functions.

The location of the buttons within the groove 11 brings them within the periphery of the ball or hollow head, and therefore the head may be grasped by the fingers or hand, for shifting the gears, without likelihood of accidental pressing of the buttons. The arrangement of the buttons within the groove also provides a ready guide for the fingers in pressing the desired button, and after a little practice the driver is enabled to press a selected button without necessity for looking at the buttons.

Having thus fully described my invention, what I claim as new and desire to secure by Letters Patent is:—

1. The combination with a tubular gear shift lever having circuit wires therein, of a hollow, hemi-spherical head on the lever for distributing the wires, a removable, hollow hemi-spherical cap and bolts securing said cap on the head, said cap having an exterior space within its periphery and a wall of said space having sockets therein, a plurality of circuit-makers mounted in the cap, and spring-pressed buttons mounted in said socket for controlling the circuit makers.

2. The combination with a tubular gear shift lever having a lateral extension and a pivotal shank on said extension, and circuit wires in the lever passing through said extension, of a hollow hemi-spherical head detachably connected to the lever, a hollow hemi-spherical cap and bolts securing said cap to the head, said cap having an exterior angular groove forming a space within the exterior periphery of the cap and a wall of said groove having a plurality of sockets therein, a plurality of circuit makers mounted within the cap, and complementary, spring-pressed buttons in said sockets for operating the circuit makers.

JOHN STAFAK.